United States Patent

[11] 3,584,734

| [72] | Inventors | Peter Henry Richards<br>Kenilworth;<br>Colin Michael Bennett, Alvechurch,<br>Birmingham, both of, England |
|---|---|---|
| [21] | Appl. No. | 822,125 |
| [22] | Filed | May 6, 1969 |
| [45] | Patented | June 15, 1971 |
| [73] | Assignee | Pilkington Brothers Limited<br>Liverpool, England |
| [32] | Priority | May 8, 1968 |
| [33] | | Great Britain |
| [31] | | 21,836/68 |

[54] CONVEYOR APPARATUS
10 Claims, 2 Drawing Figs.

[52] U.S. Cl. .................................................. 198/180,
65/107
[51] Int. Cl. .................................................. B65g 17/16,
C03b 21/02

[50] Field of Search ........................................... 198/170,
177, 180; 65/107, 182 A; 271/45

[56] References Cited
UNITED STATES PATENTS

| 867,995 | 10/1907 | Musser | 198/170 X |
| 3,332,762 | 7/1967 | McMaster | 65/182 AX |
| 3,399,042 | 8/1968 | McMaster | 65/182 AX |

*Primary Examiner*—Edward A. Sroka
*Attorney*—Morrison, Kennedy & Campbell

ABSTRACT: Glass sheets are conveyed along a furnace bed of progressively increasing curvature, by a conveyor apparatus including a number of carriages guided for longitudinal movement along one side of the bed, each carriage having a pivotally attached drive-transmitting element for engaging an adjacent edge of a glass sheet on the bed, and the drive-transmitting elements are controlled to follow the changing position of the sheet edge engaged by said element, as the sheet bends.

PATENTED JUN 15 1971

Inventors
Peter Henry Richards and
Colin Michael Bennett
By
Morrison, Kennedy & Campbell
Attorneys

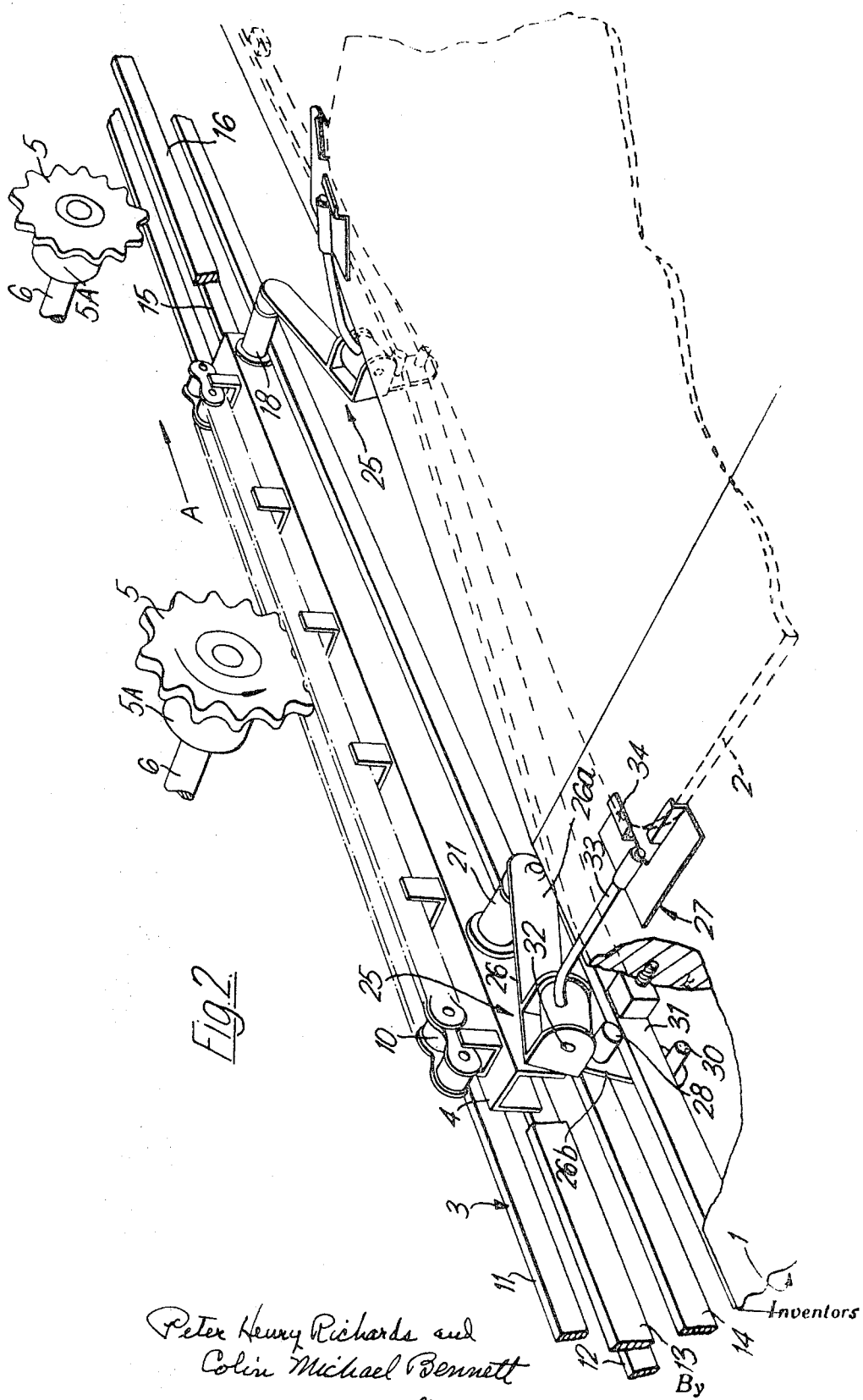

CONVEYOR APPARATUS

BACKGROUND OF THE INVENTION

This invention relates to conveyor apparatus, and more particularly to conveyor apparatus for effecting controlled displacement of a body. The invention has particular, but not exclusive application to the conveyance of articles such as glass sheets through a furnace.

When conveying articles through a furnace it is desirable to control the movement of each article, as the article is passed through successive zones in the furnace in general, during a continuous manufacturing process in which articles are carried by a conveyor through and between successive stages of manufacture, it is an advantage to permit or control changes in the shape or position of the article relative to the conveyor, without the consequent need to alter the disposition of the conveyor.

For conveying irregularly shaped articles, a common method is to engage each article with a drive-transmitting member which is itself displaced in the direction of travel of the conveyor. Each drive-transmitting member may, for example, be attached to an endless moving chain, which extends the length of the conveyor. For example, when conveying a glass sheet through a furnace where the sheet is supported for heating and bending by a gaseous bed, it is possible to permit some change in the curvature of the glass sheet. However, if the curvature to be imparted to the glass sheet is large, or the transverse dimensions of the sheet are large, then the bow or depth of curvature of the sheet will be large. By depth of curvature is meant the distance between an imaginary line joining the extreme marginal edges of the curved sheet, and a point on the curved sheet furthest from that line. In order to make allowance for this increased bow in the glass sheet, it is either necessary to lower the the line of travel of the conveyor relative to the highest part of the gaseous bed, or alternatively to raise the highest part, of the gaseous bed relative to the line of travel of the conveyor. On the one hand the line of travel of the conveyor can be gradually changed, in which case the drive mechanism required becomes more and more complex, if sudden changes of direction are to be avoided. On the other hand, if the central area of the gaseous bed is raised, then the glass sheet as it proceeds has to climb a slope of increased severity. In either case, precise control over the movement of the glass sheet at its proceeds through the furnace will become more difficult, and instability will develop in the heated glass sheet, which, being in the plastic state, will lose its faultless curvature.

An object of the present invention is to provide means for positively controlling the movement of a body during its displacement along a conveyor. Particularly this enables the bending of a heated glass sheet over a curved gaseous bed to be effected in a controlled manner, without in any way restricting or interfering with this curvature.

SUMMARY

The present invention accordingly provides conveyor apparatus for effecting controlled displacement of a body along a bed, comprising at least one carriage member movable along a conveyor guide and carrying at least one drive-transmitting element adapted to engage a body on said bed to transmit translational movement to said body, the or each said element having a pivotal connection to the carriage member such as to permit swinging movement of the element transversely to the direction of displacement of the body along the bed, and a cam surface extending in said direction of displacement and engaged by the or each drive-transmitting element, said cam surface being so contoured that said element follows a predetermined sequence of swinging movements as it is advanced along said bed by the carriage member.

Preferably the or each drive transmitting element includes a hinged bracket member which, through said pivotal connection to the respective carriage member, is capable of rocking movement about an axis transverse to the direction of carriage movement, and a body-engaging element which is pivotally attached to said bracket member at a point spaced from said pivotal connection. The or each body-transmitting element may be movable relative to the respective bracket member about a hinge axis which is substantially perpendicular to the axis of rocking movement of the bracket member.

The said cam surface is preferably constituted by a cam rail extending along one side of said bed. Each hinged bracket member may be provided with an arm-carrying cam follower means which engage both sides of the cam rail to control rocking movement of the bracket member about its pivot axis. Said cam follower means in a preferred embodiment of the invention comprise two spaced apart rollers, each rotatable about axes parallel to the pivotal axis of the bracket member, adapted to engage opposite respective sides of the cam rail.

The or each drive-transmitting element preferably comprises an arm extending towards the bed and having at its end remote from the carriage member a shaped plate element rotatable about the axis of the arm and adapted to engage a body on the bed to transmit translational movement thereto.

In a preferred embodiment of the invention the or each carriage member is elongated in its direction of movement and carries adjacent opposite ends respective guide rollers which engage the conveyor guide, the pivotal connection of the or each drive-transmitting element to the respective carriage member being located at one of said rollers so that the pivot axis of said connecting coincides with the axis of one of said guide rollers.

As stated previously, the apparatus of the invention is particularly applicable to the controlled displacement of glass sheets through a furnace bed, the or each drive-transmitting element being then adapted to engage an edge portion of said sheet to move the sheet over the bed. The said bed may have a curvature transverse to the direction of carriage movement which increases progressively in he said direction, the bed being heated in operation so that the or each glass sheet is sufficiently plastic to take up the increasing curvature of the bed as it progresses along the bed, the said cam surface being so shaped that the or each drive-transmitting element follows the movement of the respective edge portions of the sheet as the latter bends.

BRIEF DESCRIPTION OF THE DRAWINGS

FIG. 2 is a diagrammatic partly broken-away perspective view on a larger scale of one of the carriage members and associated drive-transmitting elements of the conveyor apparatus of FIG. 1.

DESCRIPTION OF THE PREFERRED EMBODIMENT

Figure 1:
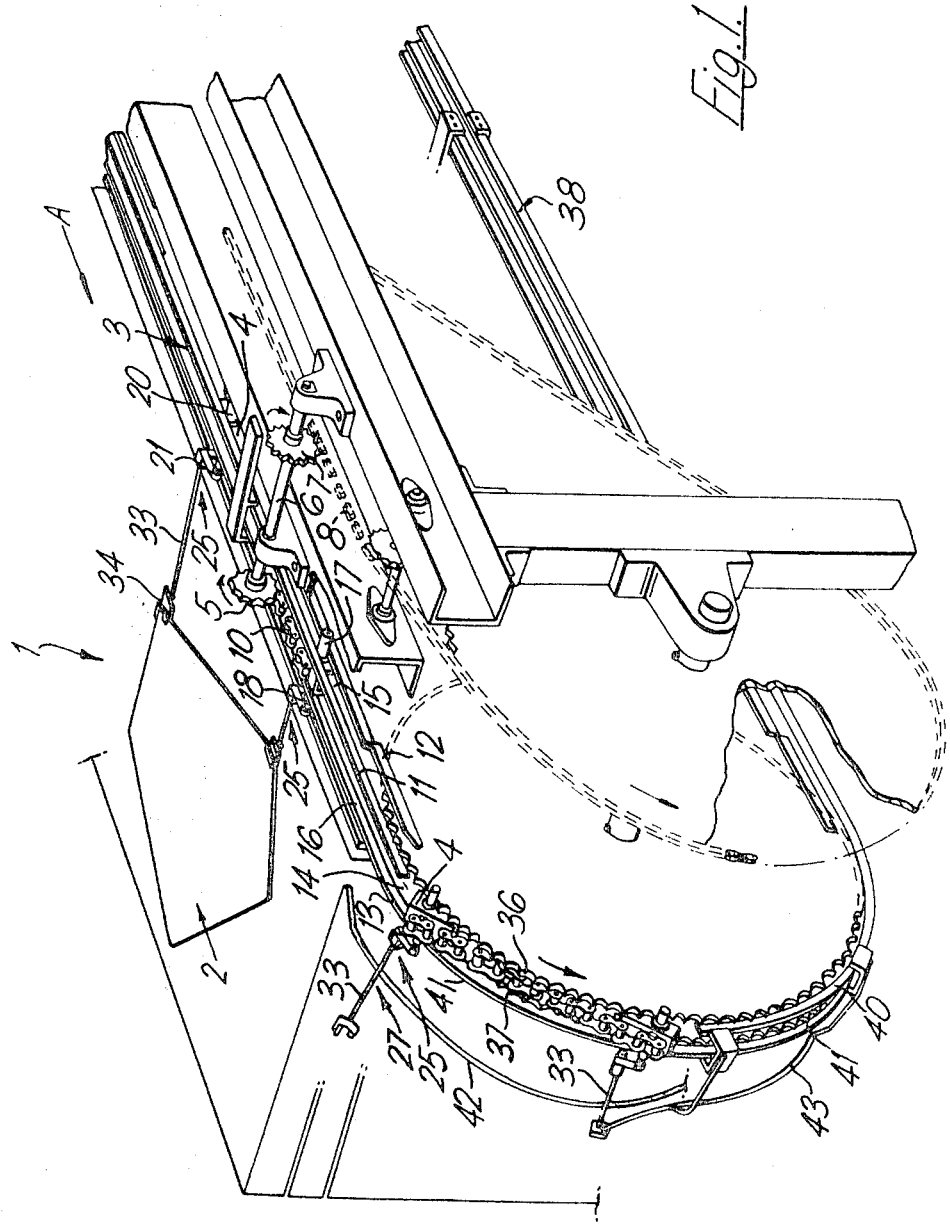
FIG. 1 is a diagrammatic partly broken-away perspective view of one end of a conveyor apparatus according to said preferred embodiment of the invention.

The drawings show conveyor apparatus for controlling the movement of heated glass sheets as they are passed over a bending section of a gaseous bed in a gas hearth furnace. The conveyor apparatus illustrated is basically similar to that described in our copending patent applications Ser. No. 771504 filed Oct. 29, 1968.

Part of a furnace of conventional construction for effecting bending of glass sheets is shown. The furnace has a generally horizontal elongated bed 1 on which sheets of glass 2 are supported by upwardly directed jets of hot gas. Thus each glass sheet 2 is supported in effect, by a cushion of air, so that surface marking of the sheet during its heating and forming is avoided. The glass sheets 2 are passed in a substantially horizontal direction through successive zones of the furnace bed including a heating zone in which each sheet is heated to a temperature at which it is sufficiently supple to effect bending to a requisite shape. After bending in a final stage in the heating zone, the sheets 2 are passed quickly to a cooling or quenching zone, where each sheet 2 is rapidly cooled to effect toughening thereof, or to an annealing zone.

Movement of the sheets 2 through the successive zones is effected by conveyor apparatus. The conveyor apparatus has a longitudinally extending carriage guide 3, along which a plurality of carriage members 4 are guided for movement in a horizontal direction (arrow A, FIG. 1) parallel to the bed 1, one carriage member 4 being provided for each glass sheet.

A plurality of drive wheels 5 are spaced at equal intervals along the carriage guide 3, the drive wheels 5 being rotatable about fixed parallel horizontal axes extending perpendicular to the direction of travel A of the carriage members 4, and all the drive wheels 5 being disposed in a common vertical plane.

The edge of each drive wheel 5 is formed with sprocket teeth which engage respective carriage members 4 successively to advance the carriage members 4 along the guide 3 in the direction A. The interval between adjacent drive wheels 5 is less than the length of each carriage member 4, so that a continuous drive is imparted to the carriage member 4.

Each drive wheel 5 is connected through a respective freewheel 5A to a respective drive shaft 6 which extends outwardly through a respective hole in a sidewall (not shown) of the furnace. The drive shafts 6 are driven by respective sprockets 7 arranged externally of the furnace wall and engaged by a common sprocket chain 8 (shown in broken lines) driven by a common driving motor. Alternatively, the shafts 6 may be driven by separate driving motors.

Each carriage member 4 comprises a length of metal bar of inverted channel section provided along its upper surface with a length of roller chain 10, the rollers of which are disposed with their axes horizontal. The length of roller chain 10 is attached to the carriage member 4 in such a manner that it forms thereon a longitudinally extending rack of transversely arranged cylindrical bars, spaced at regular longitudinal intervals. The regularly spaced recesses defined between adjacent rollers of the chain 10 are engaged by the toothed drive wheels 5, only one of which is shown in engagement with the recesses in FIG. 1, to impart a linear drive to the carriage member 4 upon rotation of the drive wheels 5.

The carriage guide 3 in this case consists of two pairs of horizontal guide rails 11, 12 and 13, 14 (FIG. 2), the rails of each pair being spaced apart vertically by respective guide slots 15, 16 which extend in the direction A, on either side of each carriage member 4. Each carriage member 4 has two pairs of flanged guide rollers 17, 18 and 20, 21, one pair near each end, the rollers of each pair being disposed on opposite sides of the carriage member 4. Each pair of guide rollers 17, 18 and 20, 21 is rotatable about a horizontal axis perpendicular to the direction of travel A of the carriage member 4, and is located in the respective slots 15, 16.

The horizontal axis about which each pair of guide rollers 17, 18 and 20, 21 rotate, is formed by a respective spindle (not shown) which is journaled in the side flanges of the respective inverted channel section carriage member 4. Pivotally attached to the ends of the respective spindles on the furnace side of the carriage guide 3, are respective drive-transmitting elements 25 for transmitting drive from the respective carriage members 4 to the glass sheets 2.

Each drive-transmitting element 25 (FIG. 2) consists of an L-shaped swinging bracket 26 having hinged thereto a glass-engaging element 27 which effects the longitudinal forward movement of the respective glass sheet 2. The longer arm 26a of the L-shaped bracket 26 is pivoted at its end to the guide roller spindle for rotation about the axis of the respective pair of guide rollers 17, 18 and 20, 21. Two spaced apart cam follower rollers 28, 30 having horizontal axes are spaced apart on the shorter arm 26b of the bracket 26. The rollers 28, 30 engage the upper and lower edge respectively of a cam rail 31 which is rigidly attached to the side of the furnace bed 1 and is so shaped that its upper edge exactly follows the contour of the adjacent edge of the furnace bed 1. By this means the angular position of each swinging bracket 26, and therefore the position of each element 27, is made to follow closely the changes which take place in the shape of the glass sheet 2, as the latter is bent progressively while being advanced along and supported on the gaseous bed 1.

Each glass-engaging element 27 is attached to the respective swinging brackets 26 by a respective hinge 32—extending parallel to the longer arm 26a of the bracket 26. Each element 27 consists of a cylindrical arm 33 extending towards the furnace bed 1 and having a shaped metal finger plate 34 at its free end. The finger plate 34 is rotatable about the axis of the arm 33 and makes direct contact with the adjacent marginal edge of the respective glass sheet 2, shown in broken lines in FIG. 2.

Each initially flat glass sheet 2 enters the furnace supported upon the gaseous bed 1, and is advanced over the bed 1 by one or more drive-transmitting elements 25. As the glass sheet 2 advances and reaches its deformation temperature, the shape of the bed 1 changes progressively, becoming gradually more curved. Typically, the central area of the bed 1 remains in the same horizontal plane, but both the edges begin to slope downwardly by an increasing amount. The outer margins of the soft glass sheet follow this changing curvature. As each edge of the bed 1 becomes lower, the cam rail 31 along that edge descends to follow the bed 1, and the respective drive-transmitting elements 25 therefore follow the changing shape of the glass sheet 2. Thus there is no sudden change in the relative positions of each drive-transmitting elements 25 and the glass sheet 2 and the development of a uniform smooth transverse curvature in the sheet 2 is unimpeded.

The conveyor apparatus can be adapted to the propulsion of large glass sheets intended for example, as vehicle windscreens and backlights. In this case two completely separate conveyor drives are provided along each side of the furnace bed with respective drive-transmitting elements 25 on each said side. In order to maintain alignment between the two sets of drive-transmitting elements 25, the carriage members 4 on opposite sides of the bed 1 may be synchronized through the respective chain drives 8 to each of the two sets of drive wheels 5 on the opposite respective sides of the furnace bed 1.

At the end of the conveyor run the carriage members 4 pass between a pair of sprocket wheels 36, 37, the pairs of rollers 17, 18 and 20, 21 engaging between respective teeth of the sprocket wheels, so that the carriage members 4 are transfered smoothly to a lower return run of the conveyor, part of which is shown at 38 in FIG. 1. The upper guide rails 11, 13 continue as arcuate rails 40, 41 around the peripheries of the respective sprocket wheels 36, 37 so that the rollers 17, 18 and 20, 21 remain in engagement therewith.

Finger support rails 42, 43 are attached to the arcuate guide rails 40, 41 and are arranged to support the arms 33 of the drive-transmitting elements 25 as the respective carriage member 4 is moved around the sprocket wheels 36, 37.

We claim:

1. Conveyor apparatus for effecting controls displacement of a body along a bed of progressively changing contour, comprising a conveyor guide, at least one carriage member movable along the conveyor guide, at least one drive-transmitting element carried by said carriage member and engageable with a body on said bed to transmit translational movement to said body, said drive-transmitting element having a pivotal connection to the carriage member which permits swinging movement of the element transversely to the direction of displacement of the carriage member, and a cam surface having a contour corresponding to the progressively changing contour of the bed, the cam surface extending in said direction of displacement and being engaged by the or each drive-transmitting element, whereby in operation of the apparatus the contoured cam surface positively causes the drive-transmitting element to follow a predetermined sequence of swinging movements, following the progressively changing contour movements, the bed, as said element is advanced along said bed by the carriage member.

2. Apparatus according to claim 1, including a hinged bracket member, first pivot means pivotally attaching said bracket member to said carriage member for rocking movement about an axis extending transversely to the direction of carriage movement, and second pivot means, spaced from the first pivot means, pivotally attaching the drive-transmitting element to said bracket member.

3. Apparatus according to claim 2, in which said second pivot means has a hinge axis which is substantially perpendicular to the axis of rocking movement of the bracket member about the first pivot means.

4. Apparatus according to claim 1 in which the said cam surface is constituted by a cam rail extending along one side of said bed.

5. Apparatus according to claim 2, in which the said cam surface is constituted by a cam rail extending along one side of said bed, and in which each hinged bracket member is provided with an arm-carrying cam follower means which engage both sides of the cam rail to control rocking movement of the bracket member about the pivot axis of said first pivot means.

6. Apparatus according to claim 5, in which said cam follower means comprise two spaced apart rollers, each rotatable about axes parallel to the pivotal axis of said first pivot means, engageable with opposite respective sides of the cam rail.

7. Apparatus according to claim 1, in which said drive-transmitting element includes an arm extending towards the bed and having at its end remote from the carriage member a shaped plate rotatable about the axis of the arm and adapted to engage a body on the bed to transmit translational movement thereto.

8. Apparatus according to claim 1, in which said carriage member is elongated in its direction of movement and carries adjacent opposite ends respective guide rollers which engage the conveyor guide, the pivotal connection of the or each drive-transmitting element to the respective carriage member being located at one of said rollers so that the pivot axis of said connection coincides with the axis of one of said guide rollers.

9. Apparatus according to claim 1 for effecting controlled displacement of a glass sheet supported on a furnace bed, the or each drive-transmitting element being adapted to engage an edge portion of said sheet to move the sheet over the bed.

10. Apparatus according to claim 9, in which the said bed has a curvature transverse to the direction of carriage movement which increases progressively in the said direction, and including means heating the bed so that in operation of the apparatus each glass sheet is sufficiently plastic to take up the increasing curvature of the bed as it progresses along the bed, the said cam surface being so shaped that said drive-transmitting element follows the movement of the respective edge portion of the sheet as the latter bends.

UNITED STATES PATENT OFFICE
CERTIFICATE OF CORRECTION

Patent No. 3,584,734　　　　　　　　　　Dated June 15, 1971

Inventor(s) Peter Henry Richards et al

It is certified that error appears in the above-identified patent and that said Letters Patent are hereby corrected as shown below:

Column 4, line 67, cancel "movements" and insert --of--.

Signed and sealed this 23rd day of January 1973.

(SEAL)
Attest:

EDWARD M. FLETCHER, JR.　　　　　　　ROBERT GOTTSCHALK
Attesting Officer　　　　　　　　　　Commissioner of Patents